United States Patent
Soeda

(10) Patent No.: US 7,519,853 B2
(45) Date of Patent: Apr. 14, 2009

(54) DISK ARRAY SUBSYSTEM, METHOD FOR DISTRIBUTED ARRANGEMENT, AND SIGNAL-BEARING MEDIUM EMBODYING A PROGRAM OF A DISK ARRAY SUBSYSTEM

(75) Inventor: Naoki Soeda, Tokyo (JP)

(73) Assignee: NEC Corporation, Tokyo (JP)

( * ) Notice: Subject to any disclaimer, the term of this patent is extended or adjusted under 35 U.S.C. 154(b) by 534 days.

(21) Appl. No.: 11/262,991

(22) Filed: Nov. 1, 2005

(65) Prior Publication Data

US 2006/0107101 A1 May 18, 2006

(30) Foreign Application Priority Data

Nov. 2, 2004 (JP) .............................. 2004-318877

(51) Int. Cl.
*G06F 11/00* (2006.01)
(52) U.S. Cl. .......................................... 714/6; 711/114
(58) Field of Classification Search ...................... 714/6; 711/114
See application file for complete search history.

(56) References Cited

U.S. PATENT DOCUMENTS

| | | | | |
|---|---|---|---|---|
| 5,678,061 | A * | 10/1997 | Mourad | 710/21 |
| 6,425,052 | B1 * | 7/2002 | Hashemi | 711/114 |
| 6,961,815 | B2 * | 11/2005 | Kistler et al. | 711/114 |
| 7,076,606 | B2 * | 7/2006 | Orsley | 711/114 |
| 7,234,074 | B2 * | 6/2007 | Cohn et al. | 714/6 |
| 7,237,062 | B2 * | 6/2007 | Lubbers et al. | 711/114 |
| 7,380,157 | B2 * | 5/2008 | Brewer et al. | 714/6 |
| 2003/0172149 | A1 * | 9/2003 | Edsall et al. | 709/224 |
| 2006/0085674 | A1 * | 4/2006 | Ananthamurthy | 714/6 |

FOREIGN PATENT DOCUMENTS

JP 09-265359 10/1997

* cited by examiner

*Primary Examiner*—Marc Duncan
(74) *Attorney, Agent, or Firm*—McGinn IP Law Group, PLLC

(57) ABSTRACT

A disk array subsystem including D disk apparatuses, wherein, there is a redundancy of N (N is an integer equal to or larger than 3), the disk array subsystem includes data regions of each of the disk apparatuses and (N−1) copy regions on each of the disk apparatuses, first copies of data to be stored in the data regions of each of the disk apparatuses are to be distributedly arranged in first copy regions of each of the disk apparatuses other than a disk apparatus from which the copies of data are to be distributedly arranged, and second copies of data to be stored in each of the first copy regions of each of the disk apparatuses are to be distributedly arranged, with respect to each of the first copy regions of each of the disk apparatuses, in second copy regions of each of the disk apparatuses other than a disk apparatus from which the second copies of data are to be distributedly arranged, and any of a disk apparatus that any of original data of the second copies are to be stored in the data region.

19 Claims, 11 Drawing Sheets

| | 5a | 5b | 5c | 5d | 5e | 5f | 5g | 5h | |
|---|---|---|---|---|---|---|---|---|---|
| L0 | 0 | 1 | 2 | 3 | 4 | 5 | 6 | 7 | ⎫ |
| L1 | 8 | 9 | 10 | 11 | 12 | 13 | 14 | 15 | |
| L2 | 16 | 17 | 18 | 19 | 20 | 21 | 22 | 23 | |
| L3 | 24 | 25 | 26 | 27 | 28 | 29 | 30 | 31 | 7 DATA REGION |
| L4 | 32 | 33 | 34 | 35 | 36 | 37 | 38 | 39 | |
| L5 | 40 | 41 | 42 | 43 | 44 | 45 | 46 | 47 | ⎭ |
| L6 | 7 | 0 | 1 | 2 | 3 | 4 | 5 | 6 | ⎫ |
| L7 | 14 | 15 | 8 | 9 | 10 | 11 | 12 | 13 | |
| L8 | 21 | 22 | 23 | 16 | 17 | 18 | 19 | 20 | 8-1 FIRST COPY REGION |
| L9 | 28 | 29 | 30 | 31 | 24 | 25 | 26 | 27 | |
| L10 | 35 | 36 | 37 | 38 | 39 | 32 | 33 | 34 | |
| L11 | 42 | 43 | 44 | 45 | 46 | 47 | 40 | 41 | ⎭ |
| L12 | 6 | 7 | 0 | 1 | 2 | 3 | 4 | 5 | ⎫ |
| L13 | 13 | 14 | 15 | 8 | 9 | 10 | 11 | 12 | |
| L14 | 20 | 21 | 22 | 23 | 16 | 17 | 18 | 19 | 8-2 SECOND COPY REGION |
| L15 | 27 | 28 | 29 | 30 | 31 | 24 | 25 | 26 | |
| L16 | 34 | 35 | 36 | 37 | 38 | 39 | 32 | 33 | |
| L17 | 41 | 42 | 43 | 44 | 45 | 46 | 47 | 40 | ⎭ |

6 MIRROR REDUNDANCY SYSTEM

Figure 2

| LOGICAL DISK APPARATUS NUMBER | LOGICAL BLOCK ADDRESS | SEGMENT NUMBER | SEGMENT CAPACITY |
|---|---|---|---|
| 0 | 0x00000000 | 0 | 4GB |
|   | 0x00800000 | 1 | 4GB |
|   | 0x01000000 | 2 | 4GB |
|   | 0x01800000 | 3 | 4GB |
|   | 0x02000000 | 4 | 4GB |
|   | 0x02800000 | 5 | 4GB |
|   | 0x03000000 | 6 | 4GB |
|   | 0x03800000 | 7 | 4GB |
|   | 0x04000000 | 8 | 4GB |
| ... | ... | ... | ... |

38 LOGICAL DISK MANAGEMENT TABLE

| SEGMENT NUMBER | MAGNETIC DISK APPARATUS NUMBER | PHYSICAL BLOCK ADDRESS | RESPONSE TIME | LOAD DISTRIBUTION RATIO |
|---|---|---|---|---|
| 0 | 0 | 0x00000000 | t00 | H00 |
|  | 1 | 0x03000000 | t01 | H01 |
|  | 2 | 0x06000000 | t02 | H02 |
| 1 | 1 | 0x00000000 | t11 | H11 |
|  | 2 | 0x03000000 | t12 | H12 |
|  | 3 | 0x06000000 | t13 | H13 |
| ... | ... | ... | ... | ... |

39 SEGMENT MANAGEMENT TABLE

|  | 5a | 5b | 5c | 5d | 5e | 5f | 5g | 5h | |
|---|---|---|---|---|---|---|---|---|---|
| L0 | 0 | 1 | 2 | 3 | 4 | 5 | 6 | 7 | ⎫ |
| L1 | 8 | 9 | 10 | 11 | 12 | 13 | 14 | 15 | |
| L2 | 16 | 17 | 18 | 19 | 20 | 21 | 22 | 23 | ⎬ 7a DATA REGION |
| L3 | 24 | 25 | 26 | 27 | 28 | 29 | 30 | 31 | |
| L4 | 32 | 33 | 34 | 35 | 36 | 37 | 38 | 39 | ⎭ |
| L5 | 7 | 0 | 1 | 2 | 3 | 4 | 5 | 6 | ⎫ |
| L6 | 14 | 15 | 8 | 9 | 10 | 11 | 12 | 13 | |
| L7 | 21 | 22 | 23 | 16 | 17 | 18 | 19 | 20 | ⎬ 8a-1 FIRST COPY REGION |
| L8 | 28 | 29 | 30 | 31 | 24 | 25 | 26 | 27 | |
| L9 | 35 | 36 | 37 | 38 | 39 | 32 | 33 | 34 | ⎭ |
| L10 | 6 | 7 | 0 | 1 | 2 | 3 | 4 | 5 | ⎫ |
| L11 | 13 | 14 | 15 | 8 | 9 | 10 | 11 | 12 | |
| L12 | 20 | 21 | 22 | 23 | 16 | 17 | 18 | 19 | ⎬ 8a-2 SECOND COPY REGION |
| L13 | 27 | 28 | 29 | 30 | 31 | 24 | 25 | 26 | |
| L14 | 34 | 35 | 36 | 37 | 38 | 39 | 32 | 33 | ⎭ |
| L15 | 5 | 6 | 7 | 0 | 1 | 2 | 3 | 4 | ⎫ |
| L16 | 12 | 13 | 14 | 15 | 8 | 9 | 10 | 11 | |
| L17 | 19 | 20 | 21 | 22 | 23 | 16 | 17 | 18 | ⎬ 8a-3 THIRD COPY REGION |
| L18 | 26 | 27 | 28 | 29 | 30 | 31 | 24 | 25 | |
| L19 | 33 | 34 | 35 | 36 | 37 | 38 | 39 | 32 | ⎭ |

6a MIRROR REDUNDANCY SYSTEM

Figure 9

| SEGMENT NUMBER | MAGNETIC DISK APPARATUS NUMBER | PHYSICAL BLOCK ADDRESS | RESPONSE TIME | LOAD DISTRIBUTION RATIO |
|---|---|---|---|---|
| 0 | 0 | 0x00000000 | t00 | H00 |
|  | 1 | 0x03000000 | t01 | H01 |
|  | 2 | 0x06000000 | t02 | H02 |
|  | 3 | 0x09000000 | t03 | H03 |
| 1 | 1 | 0x00000000 | t11 | H11 |
|  | 2 | 0x03000000 | t12 | H12 |
|  | 3 | 0x06000000 | t13 | H13 |
|  | 4 | 0x09000000 | t14 | H14 |
| ... | ... | ... | ... | ... |

39a SEGMENT MANAGEMENT TABLE

|  | PD#0 | PD#1 | PD#2 | PD#3 | PD#4 |
|---|---|---|---|---|---|
| L0 | a | b | c | d | e |
| L1 | f | g | h | i | j |
| L2 | k | l | m | n | o |
| L3 | p | q | r | s | t |
| L4 | e' | a' | b' | c' | d' |
| L5 | i' | j' | f' | g' | h' |
| L6 | m' | n' | o' | k' | l' |
| L7 | q' | r' | s' | t' | p' |

100 MIRROR REDUNDANCY SYSTEM
101 DATA REGION
102 COPY REGION

Figure 14

|  | PD#0 | PD#1 | PD#2 | PD#3 | PD#4 |
|---|---|---|---|---|---|
| L0 | a | b | c | d | e |
| L1 | f | g | h | i | j |
| L2 | k | l | m | n | o |
| L3 | p | q | r | s | t |
| L4 | e' | a' | b' | c' | d' |
| L5 | i' | j' | f' | g' | h' |
| L6 | m' | n' | o' | k' | l' |
| L7 | q' | r' | s' | t' | p' |
| L8 | d" | e" | a" | b" | c" |
| L9 | h" | i" | j" | f" | g" |
| L10 | l" | m" | n" | o" | k" |
| L11 | t" | p" | q" | r" | s" |

200 MIRROR REDUNDANCY SYSTEM
201 DATA REGION
201-1 FIRST COPY REGION
201-2 SECOND COPY REGION

|     | PD#0 | PD#1 | PD#2 | PD#3 | PD#4 |
|-----|------|------|------|------|------|
| L0  | a    | b    | c    | d    | e    |
| L1  | f    | g    | h    | i    | j    |
| L2  | k    | l    | m    | n    | o    |
| L3  | p    | q    | r    | s    | t    |
| L4  | e'   | a'   | b'   | c'   | d'   |
| L5  | i'   | j'   | f'   | g'   | h'   |
| L6  | m'   | n'   | o'   | k'   | l'   |
| L7  | q'   | r'   | s'   | t'   | p'   |
| L8  | d"   | e"   | a"   | b"   | c"   |
| L9  | g"   | h"   | i"   | j"   | f"   |
| L10 | o"   | k"   | l"   | m"   | n"   |
| L11 | r"   | s"   | t"   | p"   | q"   |

300 MIRROR REDUNDANCY SYSTEM

301 DATA REGION 301-1 FIRST COPY REGION 301-2 SECOND COPY REGION

Figure 15

DISK ARRAY SUBSYSTEM, METHOD FOR DISTRIBUTED ARRANGEMENT, AND SIGNAL-BEARING MEDIUM EMBODYING A PROGRAM OF A DISK ARRAY SUBSYSTEM

BACKGROUND OF THE INVENTION

The present invention relates to a disk array subsystem having a plurality of disk apparatuses, and in particular, to a disk array subsystem that can reduce a data loss occurrence probability when a fault occurs in a disk apparatus.

BACKGROUND ART

Conventional disk array subsystems adopt redundancy disks (RAID) that integrally manage a plurality of magnetic disk apparatuses. The RAID distributedly arranges data in the plurality of magnetic disk apparatuses and adds redundant data. Thus, in spite of the use of inexpensive magnetic disk apparatuses, the RAID makes it possible to increase data access speed and to provide a reliable data storage system.

A RAID may be roughly classified as being either a mirror redundancy system or a parity redundancy system. The mirror redundancy system fully doubles data. Doubling units have hitherto been magnetic disk apparatuses. However, an increasing number of recent doubling systems divide a magnetic disk apparatus into inherent management units, each of which is doubled. The parity redundancy system saves parity data created from user data to one magnetic disk apparatus constituting the RAID. When a magnetic disk apparatus fails, data stored in the failing magnetic disk apparatus is generated from the parity and user data stored in a surviving magnetic data apparatus.

With the mirror redundancy, data is doubled, so that the redundant data accounts for 50% of the storage capacity. However, the parity redundancy system has only to ensure a storage capacity sufficient to store the parity data. Thus, for example, in a parity redundancy RAID system that includes five magnetic disk apparatuses, the redundant data accounts for only 20% of the storage capacity.

On the other hand, with the parity redundancy system, if there is not a sufficient user data set from which a parity is to be generated, a process is required which reads the lacking part from a magnetic disk apparatus. A process of reading data from a magnetic disk apparatus is called a write penalty, but the process is required to generate parity data. Moreover, if a magnetic disk apparatus fails, the data stored in this magnetic data apparatus is reconstructed on a standby magnetic disk apparatus using the redundant data. In this case, the parity redundancy system reads all the data from all the surviving magnetic disk apparatus to generate the lost data. Accordingly, the whole RAID system is overloaded for a long time until the reconstructing process is completed.

Thus, the parity redundancy system is frequently used when storage capacity efficiency is important, in spite of the following recognized problems: the system often involves a write penalty, and the load on the system is increased while the reconstructing process is being executed for a failure in a magnetic disk apparatus. However, if it is assumed that the storage capacity of magnetic disk apparatuses is to be improved at a conventional pace, the storage capacity efficiency will not be very important. Instead, availability will be considered to be a more important measure for the provision of the intrinsic functions of the system. That is, the use of a redundancy system based on mirroring will be promoted.

Thus, the conventional art will be described below in detail in connection only with the mirror redundancy system.

Of the mirror redundancy systems, a RAID1 has hitherto been most commonly used. The RAID1 mirror redundancy system stores a copy of data stored in a disk apparatus (operated system) in a disk apparatus (standby system) different from this disk apparatus. Even if a fault occurs in the operated disk apparatus, processing can be continued by utilizing the standby disk apparatus. This improves reliability. Moreover, during a data read operation, data can be read from either the operated or standby disk apparatus. This increases processing speed.

With the RAID1 mirror redundancy system, if a fault occurs in the operated disk apparatus, read commands concentrate on the standby disk apparatus. This may markedly degrade the performance of the mirror redundancy system.

To solve such a problem, a mirror redundancy system 100 that is a component of a disk array subsystem has been proposed as shown in FIG. 13 (see, for example, Japanese Patent Laid-Open No. 9-265359). FIG. 13 shows an exemplary distribution layout showing a conventional mirror redundancy system 100 with a redundancy of "2". Mirror redundancy system 100 shown in this figure has a redundancy of "2" and includes five disk apparatuses PD#0 to PD#4.

Each of the disk apparatuses PD#0 to PD#4 has eight segments L0 to L7. Segments present on lines L0 to L3 constitute a data region 101 in which data is stored. Segments present on lines L4 to L7 constitute a copy region 102 in which a copy of data is stored.

A copy of data stored in data region 101 on a disk apparatus is distributedly arranged in copy region 102 on the four other disk apparatuses different from this disk apparatus. For example, copies a', f', k', and p' of data a, f, k, and p stored in the disk apparatus DP#0 are stored in copy region 102 on the data apparatuses PD#1 to PD#4. Further, for example, copies c', h', m', and r' of data c, h, m, and r stored in the disk apparatus PD#2 are stored in copy region 102 on the disk apparatuses PD#3 to PD#1.

As described above, even if a fault occurs in a disk apparatus (for example, the disk apparatus PD#0), read requests will not concentrate on one disk apparatus because copies a', f', k', and p' of data a, f, k, and p stored in the faulty disk apparatus PD#0 are distributedly arranged in the other disk apparatuses PD#1 to PD#4. As a result, the degradation of system performance can be suppressed compared to that of the RAID1 mirror redundancy system.

SUMMARY OF THE INVENTION

[Problems to be Solved by the Invention]

Conventional mirror redundancy system 100, shown in FIG. 13 and described in Patent Document 1, has a redundancy of "2" and therefore cannot continue processing if a fault occurs in at least two disk apparatuses. To solve such a problem, the redundancy may be increased. For example, to allow processing to be continued even if a fault occurs in two disk apparatuses, the redundancy may be set at "3" or more.

If a mirror redundancy system with a redundancy of "3" is to be constructed using the technique described in Patent Document 1, that is, the technique of distributedly arranging copies of data stored in the data region of a disk apparatus in the copy regions of the other disk apparatuses different from this disk apparatus, then it is possible to provide, for example, mirror redundancy system 200 shown in FIG. 14 or mirror redundancy system 300 shown in FIG. 15. FIG. 14 shows an exemplary distribution layout showing a conventional mirror redundancy system 200 with a redundancy of "3". FIG. 15 shows an exemplary distribution layout showing a conventional mirror redundancy system 300 with a redundancy of "3"

Mirror redundancy systems 200 and 300 each include five disk apparatuses PD#0 to PD#4. Each of the disk apparatuses PD#0 to PD#4 has 12 segments L0 to L11. Segments present on lines L0 to L3 constitute data region 201 or 301. Segments present on lines L4 to L7 constitute first copy region 201-1 or 301-1. Segments present on lines L8 to L11 constitute second copy region 201-2 or 301-2.

The relationship between data region 201 or 301 and first copy region 201-1 or 301-1 is the same as that between data region 101 and copy region 102, shown in FIG. 13. That is, a copy of data stored in data region 201 of a disk apparatus is arranged on the disk apparatuses except this disk apparatus so as to be distributed rightward starting from the disk apparatus on the right of this disk apparatus. The disk apparatus PD#0 is the one on the right of the disk apparatus PD#4, located on the right of the above disk apparatus.

In contrast, the relationship between data region 201 or 301 and second copy region 201-2 or 301-2 is slightly different from that between data region 101 and copy region 102 of FIG. 13.

In mirror redundancy system 200, shown in FIG. 14, the data stored in data region 201 of a disk apparatus is distributedly arranged on the disk apparatuses except this disk apparatus so that distribution proceeds rightward; the data is sequentially stored in the disk apparatuses starting from the third rightward disk apparatus from this disk apparatus.

Further, in mirror redundancy system 300, shown in FIG. 15, the data stored in data region 301 of a disk apparatus is distributedly arranged on the disk apparatuses except this disk apparatus so that the distribution proceeds rightward; the data is stored first in the third rightward disk apparatus from this disk apparatus and then in every other disk apparatus.

Mirror redundancy systems 200 and 300 with a redundancy of "3", shown in FIGS. 14 and 15, enable processing to be continued even if a fault occurs in two disk apparatuses.

However, with mirror redundancy systems 200 and 300, shown in FIGS. 14 and 15, if a fault occurs in at least three disk apparatuses, a data loss occurs regardless of the combination of the disk apparatuses. That is, if a mirror redundancy system with a redundancy of N (N is an integer equal to or larger than 3) is constructed utilizing the technique described in Patent Document 1, when a fault occurs in at least N disk apparatuses, a data loss occurs regardless of the combination of the faulty disk apparatuses.

In view of the foregoing and other exemplary problems, drawbacks, and disadvantages of the conventional techniques, it is an exemplary feature of the present invention to provide a disk array subsystem, a method for distributed arrangement, and a signal-bearing medium embodying a program of a disk array subsystem.

The present invention provides a disk array subsystem including D disk apparatuses, wherein, there is a redundancy of N (N is an integer equal to or larger than 3), the disk array subsystem includes data regions of each of the disk apparatuses and (N−1) copy regions on each of the disk apparatuses, first copies of data to be stored in the data regions of each of the disk apparatuses are to be distributedly arranged in first copy regions of each of the disk apparatuses other than a disk apparatus from which the copies of data are to be distributedly arranged, and second copies of data to be stored in each of the first copy regions of each of the disk apparatuses are to be distributedly arranged, with respect to each of the first copy regions of each of the disk apparatuses, in second copy regions of each of the disk apparatuses other than a disk apparatus from which the second copies of data are to be distributedly arranged, and any of a disk apparatus that any of original data of the second copies are to be stored in the data region.

An apparatus number k of a disk apparatus in which a copy of data stored in a segment with a segment number i on the data region may be determined by k={i+(i/D)mod[D−(N−1)]+n}modD in the n-th copy region.

The disk array subsystem may further include a plurality of clusters, each having the D disk apparatuses.

The disk array subsystem may further include a disk determining device that determines a disk apparatus having a segment on the data region which is a data write destination and each disk apparatus having a segment on the copy region which is a copy destination of the data, to be issuing destinations of the write command, when a write command is sent by a higher apparatus.

The disk array sub system may further comprise a segment management table that registers an apparatus number of a disk apparatus in which a segment is placed and an apparatus number of a disk apparatus in which a segment to which data stored in the segment is to be copied, for each the segment arranged in the data region. In accordance with present invention, the disk determining device that acquires, from the segment management table, the apparatus number of a disk apparatus which has a segment to which the write command is to write data and the apparatus number of a disk apparatus which has a segment to which the data to be stored in the segment is to be copied, and determines that the disk apparatuses with the apparatus numbers are issuing destinations of the write command.

The disk determining device may determine a disk apparatus to which the read command is to be issued so that loads on normally operating disk apparatuses are equalized, when a read command is sent by the higher apparatus.

The disk array subsystem may further include a data recovery device that loads, when a fault occurs in a disk apparatus, from other normally operating disk apparatuses, contents stored in each segment of the disk apparatus in which the fault is occurring and unloads the loaded contents into an alternative disk apparatus, the data recovery device determining the loading source disk apparatus so as to equalize loads on the disk apparatuses.

The present invention also provides a method of distributed arrangement including providing a disk array subsystem which includes a redundancy of N (N is an integer equal to or larger than 3) and which includes D disk apparatuses, providing data regions of each of the disk apparatuses and (N−1) copy regions on each of the disk apparatuses, distributedly arranging first copies of data to be stored in the data regions of each of the disk apparatuses in first copy regions of each of the disk apparatuses other than a disk apparatus from which the copies of data are to be distributedly arranged, and distributedly arranging second copies of data to be stored in each of the first copy regions of each of the disk apparatuses, with respect to each of the first copy regions of each of the disk apparatuses, in second copy regions of each of the disk apparatuses other than a disk apparatus from which the second copies of data are to be distributedly arranged, and any of a disk apparatus that any of original data of the second copies are to be stored in the data region.

The method may further include providing a plurality of clusters, each having the D disk apparatuses.

The method may further include when a write command is sent by a higher apparatus, determining a disk apparatus having a segment on the data region which is a data write destination and each disk apparatus having a segment on the copy region which is a copy destination of the data, to be issuing destinations of the write command.

The method may further include when a write command is sent by a higher apparatus, determining a disk apparatus having a segment on the data region which is a data write destination and each disk apparatus having a segment on the copy region which is a copy destination of the data, to be issuing destinations of the write command.

The method may further include when a read command is sent by the higher apparatus, determining a disk apparatus to which the read command is to be issued so that loads on normally operating disk apparatuses are equalized.

The method may further include when a fault occurs in a disk apparatus, loading, from other normally operating disk apparatuses, contents to be stored in each segment of the disk apparatus in which the fault is occurring, unloading the loaded contents into an alternative disk apparatus, and determining the loading source disk apparatus so as to equalize loads on the disk apparatuses.

The present invention also provide a signal-bearing medium embodying a program of machine-readable instructions executable by a digital processing apparatus, the program causing a disk array subsystem to perform a method of distributed arrangement.

The present invention also provides a signal-bearing medium embodying a program of machine-readable instructions executable by a digital processing apparatus, the program causing a disk array subsystem to perform a method of distributed arrangement that may further include providing a plurality of clusters.

The present invention also provides a signal-bearing medium embodying a program of machine-readable instructions executable by a digital processing apparatus, the program causing a disk array subsystem to perform a method of distributed arrangement that may further include when a read command is sent by the higher apparatus, determining a disk apparatus to which the read command is to be issued so that loads on normally operating disk apparatuses are equalized.

The present invention also provides a signal-bearing medium embodying a program of machine-readable instructions executable by a digital processing apparatus, the program causing a disk array subsystem to perform a method of distributed arrangement that may further include when a fault occurs in a disk apparatus, loading, from other normally operating disk apparatuses, contents to be stored in each segment of the disk apparatus in which the fault is occurring, unloading the loaded contents into an alternative disk apparatus, and determining the loading source disk apparatus so as to equalize loads on the disk apparatuses.

The disk array subsystem provided by the present invention may further include a disk determining device that determines a disk apparatus having a segment on the data region which is a data write destination and each disk apparatus having a segment on the copy region which is a copy destination of the data, to be issuing destinations of the write command, when a write command is sent by a higher apparatus.

In the disk array subsystem according to the present invention, for example, copies of data stored in the segments of the data region of each of the apparatuses may be distributedly arranged in particular copy regions of $\{D-(N-1)\}$ disk apparatuses except the above disk apparatus. In addition, the same copies as those stored in all segments of a particular copy region of each of the disk apparatuses may be distributedly arranged, for all the segments, in copy regions except the particular copy regions of $(N-2)$ disk apparatuses except the above disk apparatus and a disk apparatus which stores original data of the copies stored in the segments of the particular copy region.

If the copies are distributedly arranged as exemplarily described above, provided that the redundancy is "3", the same copies may be stored in an n-th copy region of a k-th disk apparatus and in an (n+1)-th copy region of a (k+1)-th disk apparatus adjacent to the above disk apparatus. Therefore, even if a fault occurs, for example, in three disk apparatuses (corresponding to the redundancy of 3), no data loss occurs as long as no fault occurs in two adjacent disk apparatuses.

[Exemplary Advantages of the Invention]

According to the disk array subsystem including D disk apparatuses according to the present invention, for example, even if a fault occurs in N disk apparatuses corresponding to the redundancy of N (N is an integer equal to or larger than 3), a possible data loss may be prevented provided that no fault occurs in $(N-1)$ adjacent disk apparatuses.

This may be because the disk array subsystem includes data regions of each of the disk apparatuses and $(N-1)$ copy regions on each of the disk apparatuses.

First copies of data to be stored in the data regions of each of the disk apparatuses are to be distributedly arranged in first copy regions of each of the disk apparatuses other than a disk apparatus from which the copies of data are to be distributedly arranged.

Second copies of data to be stored in each of the first copy regions of each of the disk apparatuses are to be distributedly arranged, with respect to each of the first copy regions of each of the disk apparatuses, in second copy regions of each of the disk apparatuses other than a disk apparatus from which the second copies of data are to be distributedly arranged, and any of a disk apparatus that any of original data of the second copies are to be stored in the data region.

In another exemplary aspect, this may be because copies of data stored in the segments of the data region of each of the apparatuses may be distributedly arranged in particular copy regions of $\{D-(N-1)\}$ disk apparatuses except the above disk apparatus. And for another example, this may be because the same copies as those stored in all segments of a particular copy region of each of the disk apparatuses may be distributedly arranged, for all the segments, in copy regions except the particular copy regions of $(N-2)$ disk apparatuses except the above disk apparatus and a disk apparatus which stores original data of the copies stored in the segments of the particular copy region.

Now, the exemplary advantages of the disk array subsystem according to the present invention will be described in conjunction with an exemplary disk array subsystem having a redundancy of "3" and including 16 magnetic disk apparatuses (N=3 and D=16).

That is, in the exemplary disk array subsystem according to the present invention, data loss may occur if a fault occurs in two adjacent disk apparatuses and another arbitrary disk apparatus. In contrast, in the conventional disk array subsystem, a data loss may occur if a fault occurs in three arbitrary disk apparatuses. Therefore, the number of possible combinations of three disk apparatuses in which a fault occurs to cause a data loss may be 16 ×13=208 according to the exemplary disk array subsystem according to the present invention and $_{16}C_3=(16\cdot15\cdot14)/(3\cdot2\cdot1)=3360/6=560$ according to the conventional disk array subsystem. Thus, the exemplary disk array subsystem according to the present invention may offer a reduced number of combinations of the disk apparatuses which may cause a data loss. Therefore, the disk array subsystem according to the present invention may reduce the probability of a data loss compared to the conventional disk array subsystem.

BRIEF DESCRIPTION OF THE DRAWINGS

The novel and exemplary features believed characteristic of the invention are set forth in the appended claims. The invention itself, however, as well as other exemplary features and advantages thereof, will be best understood by reference to the detailed description which follows, read in conjunction with the accompanying drawings, wherein:

FIG. 2 shows an exemplary distribution layout showing an example of the configuration of mirror redundancy system 6;

FIG. 9 shows an exemplary distribution layout showing an example of the configuration of mirror redundancy system 6a having a redundancy of "4";

FIG. 10 shows an exemplary diagram showing an example of the contents of segment management table 39a having a redundancy of "4";

FIG. 11 shows an exemplary distribution layout showing an example of the configuration of mirror redundancy system 6b having a plurality of data regions;

FIG. 13 shows an exemplary distribution layout showing a conventional mirror redundancy system 100 with a redundancy of "2";

FIG. 14 shows an exemplary distribution layout showing a conventional mirror redundancy system 200 with a redundancy of "3"; and FIG. 15 shows an exemplary distribution layout showing a conventional mirror redundancy system 300 with a redundancy of "3".

DETAILED DESCRIPTION OF THE EXEMPLARY EMBODIMENTS

Exemplary embodiments of the present invention will now be described below in detail with reference to the drawings.

[Description of Configuration of First Exemplary Embodiment]

Figure 1:
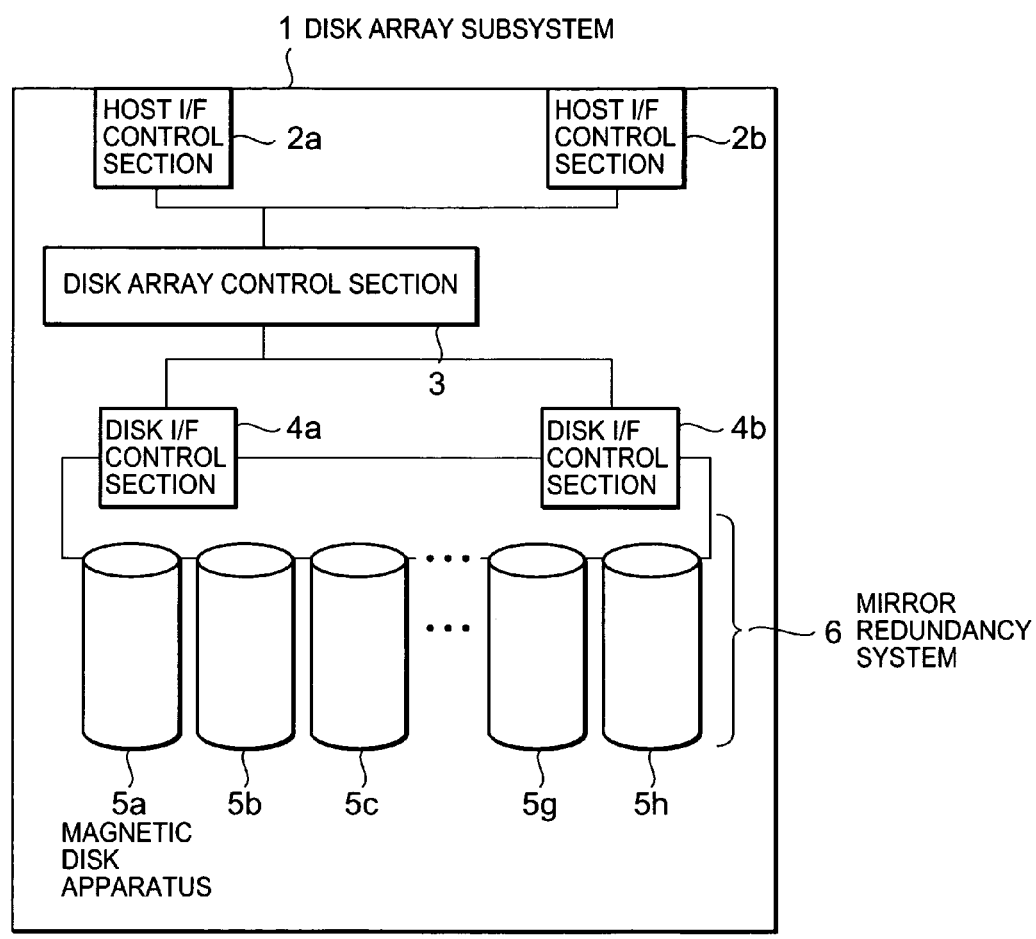
FIG. 1 shows an exemplary block diagram showing an example of the configuration of a first exemplary embodiment of a disk array subsystem according to the present invention.

FIG. 1 shows an exemplary block diagram showing an example of the configuration of a first exemplary embodiment of a disk array subsystem according to the present invention.

With reference to FIG. 1, a disk array subsystem 1 may include host I/F (Interface) control sections 2a and 2b that control commands issued by a higher system (not shown) and responses from the disk array subsystem on an interface such as an FC (Fiber Cable) or SCSI (Small Computer System Interface), disk array control section 3 that analyzes commands from the higher system to convert them into commands for magnetic disk apparatuses 5a to 5h constituting mirror redundancy system 6 and that performs other types of control, and disk I/F control sections 4a and 4b that control commands issued by disk array control section 3 and responses from magnetic disk apparatuses 5a to 5h on the interface such as an FC or SCSI.

FIG. 2 shows an exemplary distribution layout showing an example of the configuration of a mirror redundancy system 6 having a redundancy of "3". With reference to this figure, the storage region of the eight magnetic disk apparatuses 5a to 5h, constituting mirror redundancy system 6, is divided into a data region 7 in which data (original data) is stored and first and second copy regions 8-1 and 8-2 in which copies (redundant data) of the data are stored. With a redundancy of "N", the storage area of each of magnetic disk apparatuses 5a to 5h is divided into one data region and (N−1) copy regions.

Further, in FIG. 2, the number D of magnetic disk apparatuses 5a to 5h constituting mirror redundancy system 6 is 8. However, in the present invention, offering a redundancy of "3", any number of magnetic disk apparatuses may be provided as long as the number is at least 6. The relationship between the redundancy N and the number D of magnetic disk apparatuses is such that if the redundancy N is "3", at least (N+3) magnetic disk apparatuses are required and that if the redundancy N is at least "4", at least (N+2) magnetic disk apparatuses are required.

Moreover, data region 7 and first and second copy regions 8-1 and 8-2 are each divided into segments, management units inherent in the disk array subsystem. The segment may be a minimum unit for data mirroring. The same data is stored in the segments with the same data number. The excessively large area of the segment reduces the degree of freedom in configuration. The excessively small area of the segment requires a very large data management table. Accordingly, the size of the segment may be several MB to several GB. For easy description, each of data region 7 and copy regions 8-1 and 8-2 is divided into a certain number of segments (i.e., six segments).

Moreover, to prevent copies of data stored in the data region of a magnetic disk apparatus from concentrating on one magnetic disk apparatus, copies of data stored in the segments of data region 7 of each of the magnetic disk apparatuses are distributedly arranged in the copy regions 8-1 and 8-2 of the {D−(N−1)}={8−(3−1)}=6 magnetic disk apparatuses different from this magnetic disk apparatus so as to meet the condition that the copies are not arranged on the same magnetic disk apparatus.

For example, in the present exemplary embodiment, copies of the data stored in the segments of data region 7 of each of the magnetic disk apparatuses are distributedly arranged in the particular copy regions (first copy regions 8-1) of the {D−(N−1)}=6 magnetic disk apparatuses different from this magnetic disk apparatus. Further, the same copies as those stored in all the segments of first copy region 8-1 of each of magnetic disk apparatuses 5a to 5h are distributedly arranged, for all the segments, in the copy regions except the first copy regions of (N−2) magnetic disk apparatuses different from this magnetic disk apparatus and a magnetic disk apparatus that stores original data of the copies stored in first copy regions 8-1. For example, copies of the data stored in the segments (segments on lines L0 to L5) on data region 7 of magnetic disk apparatus 5a are arranged on magnetic disk apparatuses 5b to 5g in first copy region 8-1 and on magnetic disk apparatuses 5c to 5h in second copy region 8-2.

In another exemplary aspect, in the present exemplary embodiment, a disk array subsystem 1 includes data regions 7 of each of the disk apparatuses 5a to 5h and (N−1) copy regions on each of the disk apparatuses 5a to 5h.

First copies of data to be stored in the data regions 7 of each of the disk apparatuses 5a to 5h are to be distributedly arranged in first copy regions 8-1 of each of the disk apparatuses 5a to 5h other than a disk apparatus from which the copies of data are to be distributedly arranged (i.e., copies of data "0", "8", "16", "24", "32", and "40" are distributedly arranged in first copy regions 8-1 of each of the disk apparatus 5b (or any of disk apparatus 5c to 5h) other than a disk apparatus 5a from which the copies of data are to be distributedly arranged).

Second copies of data to be stored in each of the first copy regions 8-1 of each of the disk apparatuses 5a to 5h are to be distributedly arranged, with respect to each of the first copy regions 8-1 of each of the disk apparatuses 5a to 5h, in second copy regions 8-2 of each of the disk apparatuses 5a to 5h other than a disk apparatus from which the second copies of data are to be distributedly arranged, and any of a disk apparatus that any of original data of the second copies are to be stored in the data region (i.e., second copies of "0", "15", "22", "29", "36", and "43" which belong to the disk apparatus 5b and the first copy region 8-1 are to be distributedly arranged, in second copy regions 8-2 of each of the disk apparatuses 5c other than the disk apparatus 5b from which the second copies of data are to be distributedly arranged and disk apparatuses 5a, 5d, 5e, 5f, 5g, and 5h that any of original data of the second copies ("0", "15", "22", "29", "36", and "43") are to be stored in the data region 7).

A rule for the determination of a magnetic disk apparatus that is a copy destination is formulated, for example, as shown below.

[Formula 1] (1)

$$k = \left\{ i + \underbrace{\left(\frac{i}{D}\right)}_{(a)} \underbrace{\text{mod}[D - (N-1)]}_{(b)} + n \right\} \text{mod } D$$

$\underbrace{\phantom{xxxxxxxxxxxx}}_{(c)}$ $\underbrace{\phantom{xxxxxxxxxxxxxxxx}}_{(d)}$ $\underbrace{\phantom{xxxxxxxxxxxxxxxxxxxx}}_{(e)}$ $\underbrace{\phantom{xxxxxxxxxxxxxxxxxxxxxxxx}}_{(f)}$ In Formula (1), D may be the total number of magnetic disk apparatuses, N denotes a redundancy, and i may be a segment number. Further, n may be a copy region number, and k denotes the apparatus number of the magnetic disk apparatus in which a copy of the data stored in the segment with the segment number i is placed in the copy region with the copy region number n. In the present exemplary embodiment, D=8 and N=3. Further, in the present exemplary embodiment, the copy region numbers n of the first and second copy regions 8-1 and 8-2 are "1" and "2", respectively. The magnetic disk apparatus numbers k of magnetic disk apparatuses 5a to 5h are "0" to "7", respectively.

The meaning of Formula (1) will be described below.

Part (a) of Formula (1) determines the line number of the line on which the segment with the segment number i in which data is stored is present (the line numbers of lines L0, L1, . . . in FIG. 2 are 0, 1, . . . ). (i/D) denotes the quotient (integer part) of i divided by D.

Part (b) of Formula (1) determines the number of magnetic disk apparatuses in which copies can be distributedly arranged. In mirror redundancy system 6, shown in FIG. 2, the value determined by part (b) is D−(N−1)=8−(3−1)=6.

Part (c) of Formula (1) obtains mod of a line number for the number of magnetic disk apparatus in which copies can be distributedly arranged to determine the ordinal number of each of the magnetic disk apparatuses (in the example shown in FIG. 2, six magnetic disk apparatuses) in which copies can be distributedly arranged, the magnetic disk apparatus being used to store the corresponding copy, the ordinal number being counted from the leftmost magnetic disk apparatus. A value determined by part (c) falls within the range of 0 to [{D−(N−1)}−1]. It is 0 to 5 for mirror redundancy system 6 shown in FIG. 2.

Part (d) of Formula (1) adds the copy region number n and the value determined by part (c) to determine the rightward distance between the magnetic disk apparatus in which the data is originally stored and each of the magnetic disk apparatuses in which the copies are to be distributedly arranged, the rightward distance corresponding to the number of magnetic disk apparatuses, in the copy region with the copy region number n.

Part (e) of Formula (1) adds the value determined by part (d) and the segment number i of the segment in which the corresponding copy source data is stored to determine the segment number of a segment that may be present, in the copy region with the copy region number n, on the magnetic disk apparatus in which the data copy is to be distributedly arranged.

Part (f) of Formula (1) takes mod D of the segment number determined by part (e) to determine the apparatus number of the magnetic disk apparatus in which the corresponding data copy is to be distributedly arranged.

The meaning of Formula (1) has been described. Formula (1) indicates only the rule for the determination of magnetic disk apparatuses to which the data is to be copied. The formula does not indicate which of the segments on the magnetic disk apparatus the corresponding copy is to be stored in. If the segment in which the copy is stored is present on an x-th line in the data region, the segment in which the corresponding copy is to be stored may be present on the x-th line in the corresponding copy region. For example, in the example shown in FIG. 2, if data is stored in a segment on the second line (line L1) in data region 7, a copy of the data is stored in the segment in the second line (line L7) in first copy region 8-1 and in the segment in the second line (line L13) in second copy region 8-2.

Figures 3, 4:
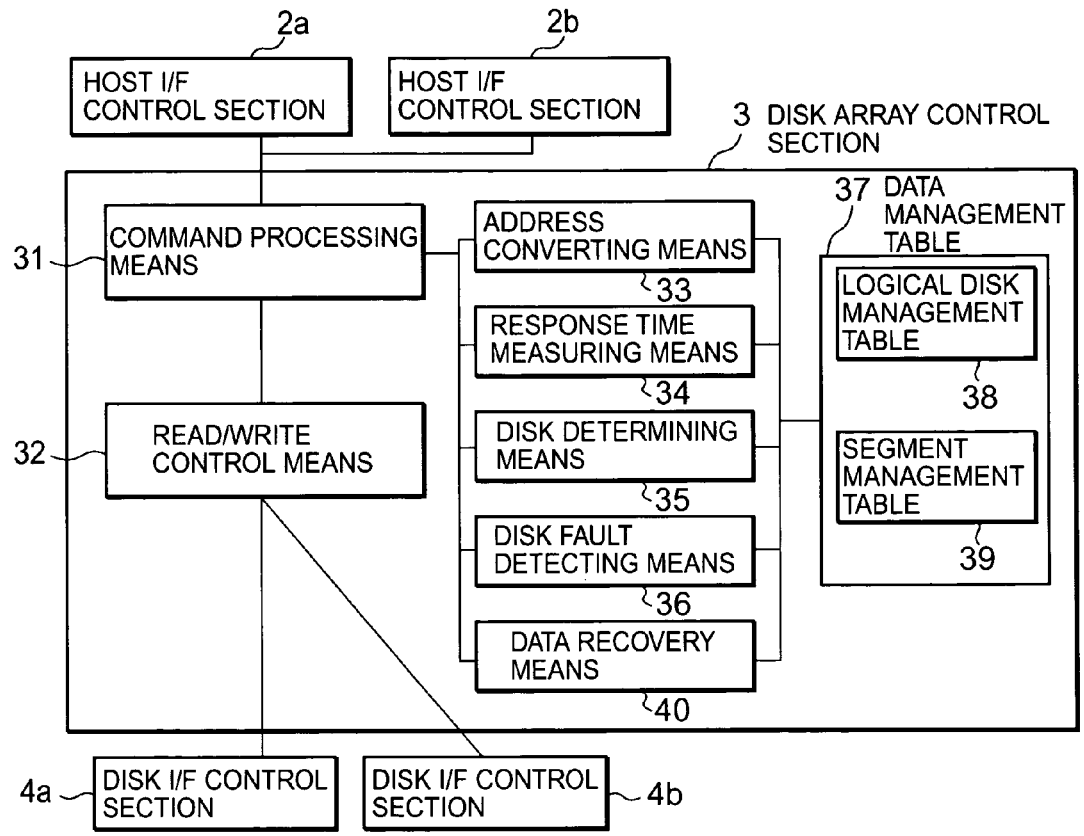
FIG. 3 shows an exemplary block diagram showing an example of the configuration of disk array control section 3.
FIG. 4 shows an exemplary diagram showing an example of the contents of logical disk management table 38.

FIG. 3 shows an exemplary block diagram showing an example of the configuration of disk array control section 3 in disk array subsystem 1. With reference to this figure, disk array control section 3, command processing means 31, read/write control means 32, address converting means 33, response time measuring means 34, disk determining means 35, disk fault detecting means 36, data management table 37, and data recovery means 40.

Data management table 37 includes logical disk management table 38 and segment management table 39.

Logical disk management table 38 holds the correspondences between segment number and the logical disk apparatus number of a logical disk apparatus recognized by the higher apparatus and logical block addresses. FIG. 4 shows an exemplary diagram showing an example of the contents of logical disk management table 38. The example in FIG. 4 shows that the logical disk number "0" and the logical block addresses "0x00000000, . . . , 0x04000000" correspond to the segment numbers "0, . . . , 8" and that the capacity of each segment is "4 GB", for example.

Figures 5, 6:
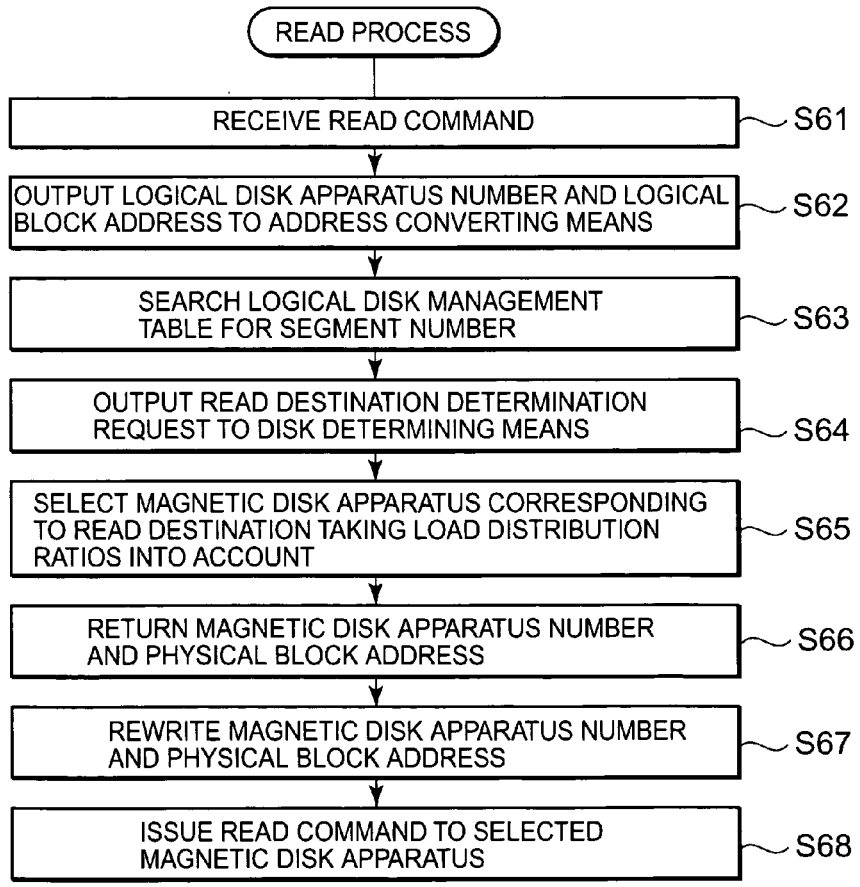
FIG. 5 shows an exemplary diagram showing an example of the contents of segment management table 39.
FIG. 6 shows an exemplary flowchart showing an example of processing executed during a read operation.

Segment management table 39 holds, in association with the segment numbers of segments, the apparatus numbers of magnetic disk apparatuses in which the segments with the segment numbers are present, physical block addresses, response times, and load distribution ratios. FIG. 5 shows an exemplary diagram showing an example of the contents of segment management table 39.

The magnetic disk apparatus numbers indicate the apparatus numbers of the magnetic disk apparatuses in which the segments with the segment numbers registered in association with the magnetic disk apparatus numbers are present. In the present exemplary embodiment, since the redundancy is "3", for example, three magnetic disk apparatus numbers are registered in association with one segment number. For example, with reference to FIG. 2, the segment with the segment number "0" is present in magnetic disk apparatuses 5a, 5b, and 5c. Thus, in the example shown in FIG. 5, the apparatus numbers "0", "1", and "2" of magnetic disk apparatuses 5a, 5b, and 5c are registered in association with the segment number "0".

The physical block addresses correspond to the segments with the same segment number present on three magnetic disk apparatuses. The example shown in FIG. 5 show that the physical block addresses of the segments with the segment number "0" present on magnetic disk apparatuses 5a, 5b, and 5c are "0x00000000", "0x03000000", and "0x06000000".

The response time may be the time required for the magnetic disk apparatus to process a read or write request and is set by response time measuring means 34. In the example shown in FIG. 5, the response times t00, t01, and t02 registered in association with the segment number "0" correspond to magnetic disk apparatuses 5a, 5b, and 5c, respectively.

The load distribution ratio indicates the ratio of accesses to the segments with the same segment number present on three different magnetic disk apparatuses (a segment with a higher load distribution ratio is more frequently selected) and is set by response time measuring means 34. The example shown in FIG. 5 indicates that the load distribution ratios of the segments with the segment number "0" present on magnetic disk apparatuses 5a, 5b, and 5c are H00, H01, and H02. The load distribution ratio decreases with increasing corresponding response time. The load distribution ratio for a faulty magnetic disk apparatus is "0", for example.

Command processing means 31 of FIG. 3 may include the following functions:

Function for, when a read or write command is sent by the higher apparatus via host I/F control sections 2a and 2b, passing a logical disk apparatus number and a logical block address contained in the parameters of the command to address converting means 33 and causing the segment number corresponding to the logical disk apparatus number and logical block address to be retrieved from logical disk management table 38;

Function for, if a read command is sent by the higher apparatus, outputting, to disk determining means 35, a read destination determination request containing the segment number retrieved by address converting means 33;

Function for, if a write command is sent by the higher apparatus, outputting, to disk determining means 35, a write destination determination request containing the segment number retrieved by address converting means 33; and Function for rewriting the logical disk apparatus number and logical block address in the command sent by the higher apparatus with magnetic disk apparatus number and physical block address returned by disk determining means 35 and passing the rewritten command to read/write control means 32.

Read/write control means 32 may include a function for issuing a command to the magnetic disk apparatus specified by the magnetic disk apparatus number in the command.

Address converting means 33 may include a function for retrieving the segment number corresponding to the logical disk apparatus number and logical block address passed by command processing means 31 and returning them to command processing means 31.

Response time measuring means 34 may include a function for measuring the response times of magnetic disk apparatuses 5a to 5h and a function for updating the response times or load distribution ratios registered in segment management table 39.

Disk determining means 35 may include a function for, if command processing means 31 passes a read destination determination request containing a segment number to disk determining means 35, determining one of the magnetic disk apparatuses in each of which the segment with the segment number is placed so as to equalize the response times of (loads on) the magnetic disk apparatuses.

In the present exemplary embodiment, segment management table 39 is referenced to determine the one of the magnetic disk apparatuses to be a read destination, taking the load distribution ratios of the magnetic disk apparatuses in which the described above segment is placed into account. However, other methods may be adopted. For example, one of the magnetic disk apparatuses may be circularly selected to be a read destination.

Moreover, disk determining means 35 may include a function for, if command processing means 31 passes a write destination determination request containing a segment number to disk determining means 35, determining the magnetic disk apparatus in which the segment with the segment number is placed and which is operating correctly, to be a write destination.

In the present exemplary embodiment, if a write destination determination request containing a segment number is passed by command processing means 31, one of the magnetic disk apparatuses is determined to be a write destination by referencing segment management table 39 to select one of the magnetic disk apparatus numbers registered in association with the segment number which may not have a load distribution ratio of "0".

Disk fault detecting means 36 may include a function for detecting a fault in each of magnetic disk apparatuses 5a to 5h and a function for actuating data recovery means 40 when a fault is detected.

Data recovery means 40 may include a function for, when actuated by disk fault detecting means 36, recovering and storing data and in an alternative magnetic disk apparatus (not shown).

Disk array control section 3 can be implemented using a computer (CPU). If disk array control section 3 is implemented using a computer, then for example, the following method is used. A disk, semiconductor memory, or another recording medium may be provided on which a program for allowing the computer to function as disk array control section 3 may be recorded. The computer may be allowed to read the program. The computer controls its own operations in accordance with the read program to realize, on itself, command processing means 31, read/write control means 32, address converting means 33, response time measuring means 34, disk determining means 35, disk fault detecting means 36, and data recovery means 40.

[Description of Exemplary Operations According to First Exemplary Embodiment]

Now, a detailed exemplary description will be given of operations according to the present exemplary embodiment.

[Exemplary Operations During Read Process]

First, a detailed exemplary description will be given of operations during a read process. FIG. 6 shows an exemplary flowchart showing an example of processing executed during a read operation.

Upon receiving a read command from the higher apparatus (step S61 in FIG. 6), command processing means 31 passes to address converting means 33 a logical disk apparatus number and a logical block address contained in the parameters of the command (step S62).

Thus, address converting means 33 retrieves logical disk management table 38 for the segment number corresponding to the logical disk apparatus number and logical block address and returns the retrieved segment number to command processing means 31 (step S63). For example, the logical disk apparatus number and logical block address in the read command are assumed to be "0" and "0x00000000", and the contents of logical disk management table 38 are assumed to be as shown in FIG. 4. Then, address converting means 33 returns the segment number "0" to command processing means 31.

When the segment number is returned by the address converting member 33, command processing means 31 outputs a read destination determination request containing the segment number to disk determining means 35 (step S64).

Thus, on the basis of the segment number contained in the read destination determination request and the contents of segment management table 39, the disk determining section 35 selects one of the magnetic disk apparatuses as a read destination (step S65). Subsequently, disk determining means 35 returns, to command processing means 31, the apparatus number of the magnetic disk apparatus selected in step S65 and the physical block address registered in segment management table 39 in association with the apparatus number (step S66).

The processing in steps S65 and S66 will be described in detail. The segment number contained in the read destination determination request is assumed to be "0", and the contents of segment management table 39 are assumed to be as shown in FIG. 5. First, disk determining means 35 searches segment management table 39 for an entry in which the segment number "0" is registered.

Subsequently, disk determining means 35 determines one of the magnetic disk apparatuses to be a read destination on the basis of the load distribution ratios H00, H01, and H02 in the entry obtained.

For example, if the load distribution ratios H00, H01, H02 are "2", "1", and "1", one of the magnetic disk apparatuses 5a, 5b, and 5c with the magnetic disk apparatus numbers "0", "1", and "2" is determined to be a read destination so that the ratio in which magnetic disk apparatuses 5a, 5b, and 5c are determined to be a read destination is 2:1:1.

Then, if for example, magnetic disk apparatus 5c with the magnetic disk apparatus number "2" is selected as a read destination, the following are returned to command processing means 31: the magnetic disk apparatus number "2" and the physical block address "0x06000000", registered in segment management table 39 in association with the magnetic disk apparatus number "2". The processing executed in steps S65 and S66 has been described in detail.

When the magnetic disk apparatus number and physical block address are returned by disk determining means 35, command processing means 31 rewrites the logical disk apparatus number and logical block address in the read command from the higher apparatus with the returned magnetic disk apparatus number and physical block address. Command processing means 31 passes the rewritten read command to read/write control means 32 (step S67). Thus, read/write control means 32 issues the read command to the magnetic disk apparatus selected by disk determining means 35 (magnetic disk apparatus indicated by the parameters in the command) (step S68).

[Operations During Write Process]

Figure 7:
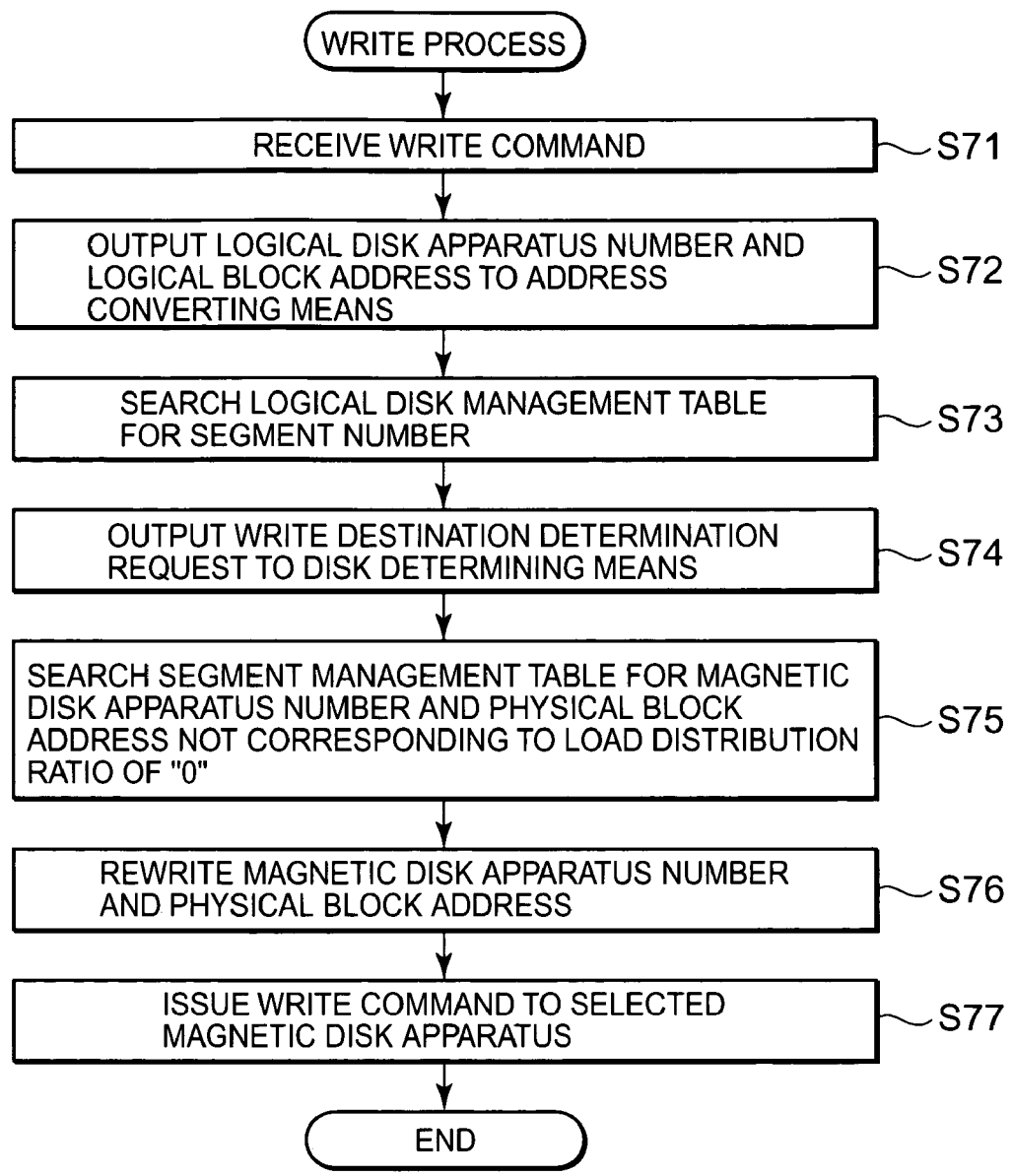
FIG. 7 shows an exemplary flowchart showing an example of processing executed during a write operation.

Now, operations during a write process will be described. FIG. 7 shows an exemplary flowchart showing an example of processing executed during a write operation.

Upon receiving a write command from the higher apparatus (step S71 in FIG. 7), command processing means 31 passes address converting means 33 a logical disk apparatus number and a logical block address contained in the parameters of the command (step S72).

Thus, address converting means 33 searches logical disk management table 38 for the segment number corresponding to the logical disk apparatus number and logical block address. Address converting means 33 then returns the segment number obtained to command processing means 31 (step S73).

When the segment number is returned by address converting means 33, command processing means 31 passes disk determining means 35 a write destination determination request containing the segment number (step S74).

Thus, disk determining means 35 determines one of the magnetic disk apparatuses to be a write destination on the basis of the segment number in the write destination determination request and the contents of segment management table 39 (step S75).

The processing in step S75 will be described below in detail. For example, the segment number in the write destination determination request is assumed to be "1" and the contents of segment management table 39 are assumed to as shown in FIG. 5. Then, disk determining means 35 first searches segment management table 39 for an entry in which the segment number "1" is registered. Subsequently, disk determining means 35 selects those of the pairs of the magnetic disk apparatus number and physical block addresses stored in the entry which have load distribution ratios that are not "0". Disk determining means 35 then returns the selected pairs of the magnetic disk apparatus number and physical block address to command processing means 31. The processing executed in step S75 has been described in detail.

When the pairs of the magnetic disk apparatus number and physical block address are returned by disk determining means 35, command processing means 31 rewrites, for each returned pair, the logical disk apparatus number and logical block address in the write command sent by the higher apparatus with the returned magnetic disk apparatus number and physical block address. Command processing means 31 passes the rewritten write command to read/write control means 32 (step S76). If for example, three pairs of the magnetic disk apparatus number and physical block address are returned by disk determining means 35, command processing means 31 passes three write commands to read/write control means 32.

Read/write control means 32 issues the write commands passed by command processing means 31 to the corresponding magnetic disk apparatus (selected in step S75) (step S77).

[Exemplary Operations Performed when Fault Occurs]

Figure 8:
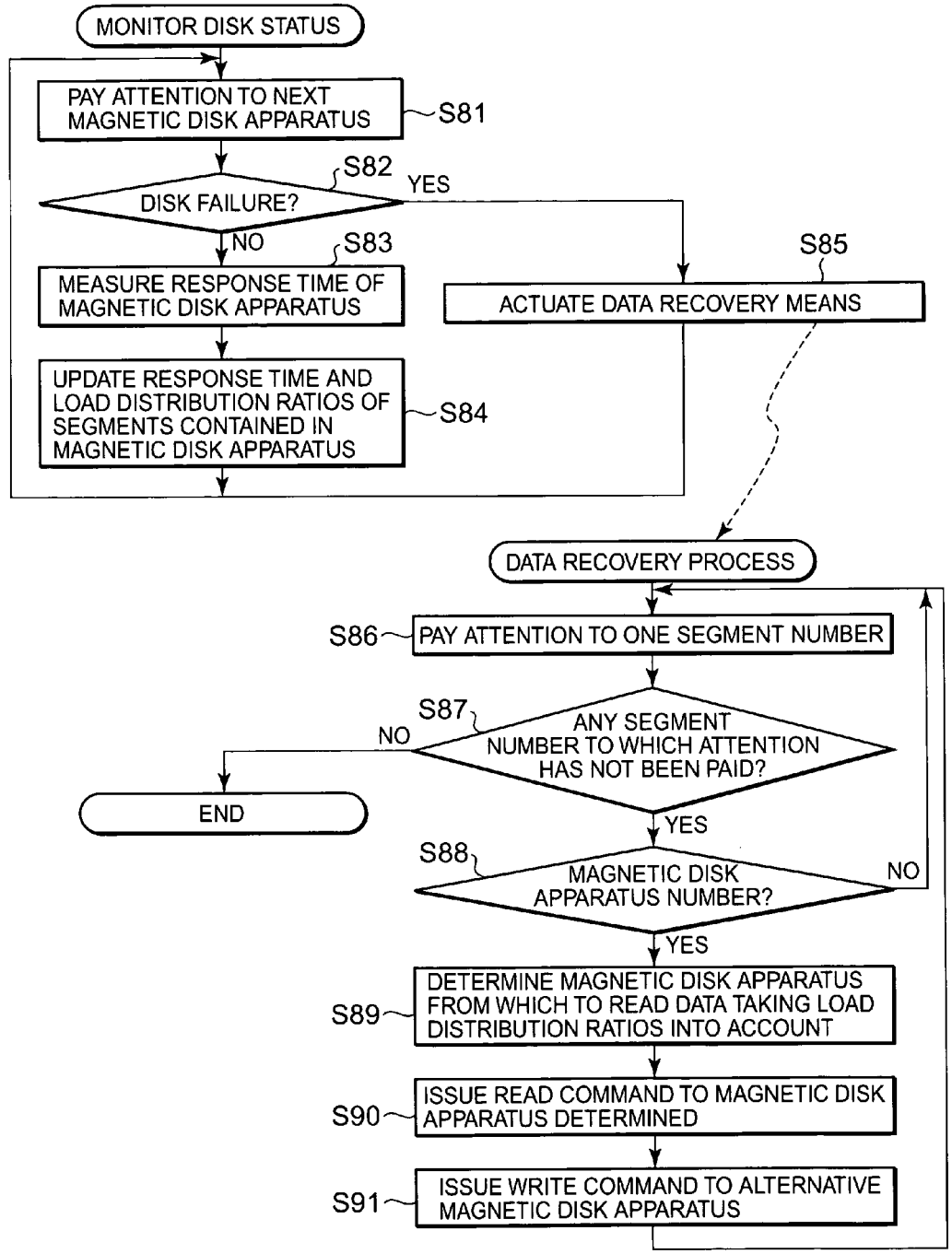
FIG. 8 shows an exemplary flowchart showing an example of processing executed when a fault occurs.

Now, exemplary description will be given of operations performed when a fault occurs in any of magnetic disk apparatuses 5a to 5h, constituting mirror redundancy system 6. FIG. 8 shows an exemplary flowchart showing an example of processing executed when a fault occurs Disk fault detecting means 36 in disk array control section 3 pays attention to one of magnetic disk apparatuses 5a to 5h, constituting mirror redundancy system 6, to check whether or not that magnetic disk apparatus is faulty (steps S81 and S82 in FIG. 8).

If this magnetic disk apparatus is not faulty (NO in step S82), disk fault detecting means 36 instructs response time measuring means 34 to measure the response time of the magnetic disk apparatus. Thus, response time measuring means 34 measures the response time required for the magnetic disk apparatus to respond to a read or write command (step S83). Response time measuring means 34 further updates the response time of this magnetic disk apparatus registered in segment management table 39, to the measured response time (step S84). Moreover, in step S84, response time measuring means 34 updates the corresponding load distribution ratio. Subsequently, disk fault detecting means 36 pays attention to the next magnetic disk apparatus (step S81) to execute a process similar to that described above.

In contrast, if the magnetic disk apparatus is faulty (YES in step S82), disk fault detecting means 36 actuates data recovery means 40 and pass the apparatus number of the faulty magnetic disk apparatus to data recovery means 40. Disk fault detecting means 36 also changes, to "0", all of the load distribution ratios corresponding to this magnetic disk apparatus registered in segment management table 39 (step S85). Disk fault detecting means 36 excludes the magnetic disk apparatus determined to be faulty from the possible targets in step S81.

Upon actuation, data recovery means 40 pays attention to one of the segment numbers registered in segment management table 39 (step S86). Subsequently, the data recovery means determines whether or not any of the magnetic disk apparatus numbers registered in association with the above segment number corresponds to a faulty magnetic disk apparatus (step S88).

If none of the magnetic disk apparatus numbers correspond to faulty magnetic disk apparatuses (NO in step S88), the data recovery means pays attention to the next segment number (step S86). In contrast, if any of the magnetic disk apparatus numbers corresponds to a faulty magnetic disk apparatus, the data recovery means determines the magnetic disk apparatus from which data is to be read on the basis of the load distribution ratios of the magnetic disk apparatuses except the faulty one (step S89). For example, the magnetic disk apparatus with the highest load distribution ratio is determined to be the magnetic disk apparatus from which data is to be read. If the magnetic disk apparatuses have the same load distribution ratio, the magnetic disk apparatus from which data is to be read is determined in accordance with a predetermined rule.

Then, data recovery means 40 passes the command processing means 31 a read command containing the magnetic disk apparatus number of the magnetic disk apparatus determined and the physical block address registered in segment management table 39 in association with this magnetic disk apparatus number. Thus, the read command is issued to the magnetic disk apparatus via command processing means 31 and read/write control means 32 (step S90). The data read from the magnetic disk apparatus is passed to data recovery means 40.

Subsequently, data recovery means 40 passes command processing means 31 a write command containing the data, the apparatus number of an alternative disk apparatus, and the physical block address registered in segment management table 39 in association with the apparatus number of the faulty magnetic disk apparatus. Thus, the write command is issued to the alternative magnetic disk apparatus via command processing means 31 and read/write control means 32 (step S91). The data is written to the corresponding segment in the alternative magnetic disk apparatus.

Data recovery means 40 executes the above process on all the segment numbers registered in segment management table 39 (NO in step S87). Data recovery means 40 then finishes the process.

It is assumed that magnetic disk apparatus 5a with the magnetic disk apparatus number "0" becomes faulty and that the contents of segment management table 39 are as shown in FIG. 5. Then, the processing described below is executed.

When actuated by disk fault detecting means 36, data recovery means 40 first pays attention to the segment number "0" registered in segment management table 39 (step S86). Subsequently, data recovery means 40 checks whether or not the apparatus number "0" of the faulty magnetic disk apparatus is registered in association with the segment number "0" (step S88). In this case, the magnetic disk apparatus numbers "0", "1", and "2" are registered in association with the segment number "0". Accordingly, the determination in step S88 is YES and the processing in step S89 is executed.

In step S89, data recovery means 40 determines the magnetic disk apparatus from which data is to be read on the basis of the load distribution ratios H01 and H02 registered in segment management table 39 in association with the apparatus numbers "1" and "2" of the normally operating magnetic disk apparatuses 5b and 5c. If, for example, H01>H02, the data is to be read from magnetic disk apparatus 5b with the apparatus number "1".

Then, data recovery means 40 passes command processing means 31 a read command containing the magnetic disk apparatus number "1" and the physical block address "0x03000000", registered in association with the magnetic disk apparatus "1". Thus, the read command is issued to magnetic disk apparatus 5b (step S90). The data read from magnetic disk apparatus 5b is passed to data recovery means 40.

Subsequently, data recovery means 40 passes command processing means 31 a write command containing the data, the apparatus number of an alternative disk apparatus, and the physical block address "0x00000000", registered in segment management table 39 in association with the apparatus number of the faulty magnetic disk apparatus 5a. Thus, the write command is issued to the alternative magnetic disk apparatus via command processing means 31 and read/write control means 32 (step S91). A copy of the data is stored in the corresponding segment in the alternative magnetic disk apparatus.

On this occasion, if the data write operation on the alternative magnetic disk apparatus acts as a bottleneck, each magnetic disk apparatus is provided with a region to which the recovery data is temporarily saved or the recovery data is retained on the memory. This desirably minimizes the time for which the redundancy remains lower. Such a load distribution algorithm, as shown in the example of the load distribution for the read request, is used so as to keep the balance between the data recovery load and the normal load imposed by the higher system.

Once the process for the segment "0" is finished, data recovery means 40 pays attention to the next segment number "1" in segment management table 39 (step S86) to execute a process similar to that described above. The data recovery means executes the above process on all the segments number registered in segment management table 39 (NO in step S87). Data recovery means 40 thus finishes its process.

In the above exemplary description, disk array subsystem 1 may include a redundancy of "3". However, the redundancy is not limited to this as long as it is at least "3". FIG. 9 shows an exemplary distribution layout showing an example of the configuration of mirror redundancy system 6a having a redundancy of "4" If for example, disk array subsystem 1 may include a redundancy of "4", such a mirror redundancy system 6a as shown in FIG. 9 is used in place of mirror redundancy system 6. FIG. 10 shows an exemplary diagram showing an example of the contents of segment management table 39a having a redundancy of "4". Further, such a segment management table 39a as shown in FIG. 10 is used in place of segment management table 39.

With reference to FIG. 9, for example, mirror redundancy system 6a includes eight magnetic disk apparatuses 5a to 5h provided with magnetic disk apparatus numbers "0" to "7". For example, the storage region of each of magnetic disk apparatuses 5a to 5h is divided into one data region 7a and three copy regions, a first to third copy regions 8a-1 to 8a-3. Furthermore, for example, data region 7a and the copy regions 8a-1 to 8a-3 are each divided into five segments. Moreover, for example, copies of data stored in the segments of data region 7a are stored in the copy regions 8a-1 to 8a-3 so as to meet Formula (1).

With reference to FIG. 10, segment management table 39a includes a redundancy of "4", four magnetic disk apparatus numbers, four physical block addresses, four response times, and four load distribution ratios are registered in segment management table 39a in association with one segment number.

Figure 11:
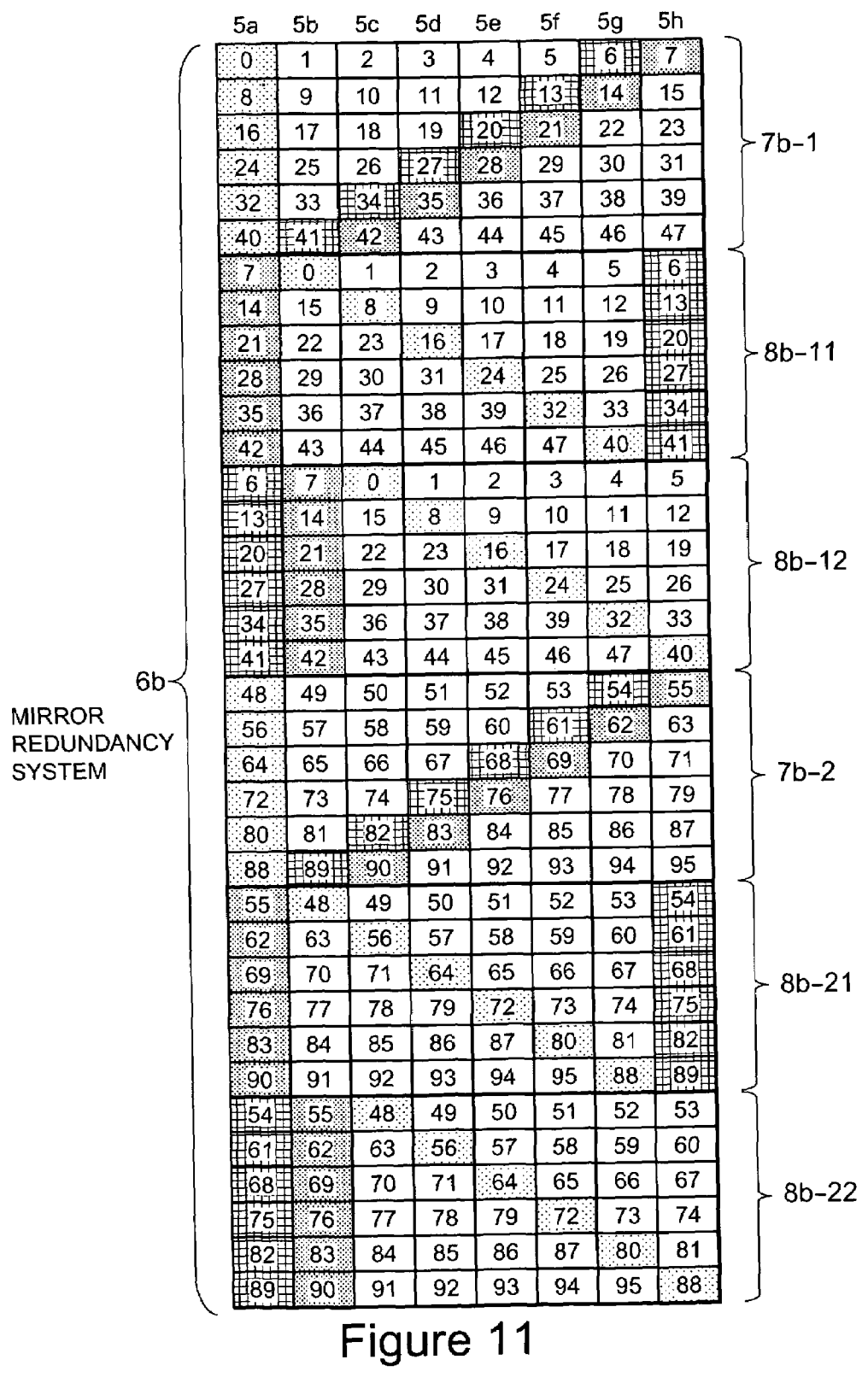

In the above exemplary description, as shown in FIG. 2, the storage region of each of magnetic disk apparatuses 5a to 5h is divided into the one data region 7 and the two copy regions 8-1 and 8-2, for example. However, for example, the storage region of each of magnetic disk apparatuses 5a to 5h is divided into two data regions 7b-1 and 7b-2, two copy regions 8b-11 and 8b-12 for data region 7b-1, and two copy regions 8b-21 and 8b-22 for data region 7b-2 as in the case of a mirror redundancy system 6b shown in FIG. 11. FIG. 11 shows an exemplary distribution layout showing an example of the configuration of a mirror redundancy system 6b having a plurality of data regions.

Exemplary Advantages of First Exemplary Embodiment

With the disk array subsystem with the redundancy N (N is an integer equal to or larger than 3) according to the present exemplary embodiment, even if a fault occurs in the N magnetic disk apparatuses, a possible data loss can be prevented provided that no fault occurs in (N−1) adjacent magnetic disk apparatuses.

This may be because the disk array subsystem includes data regions 7 of each of the disk apparatuses 5a to 5h and (N−1) copy regions on each of the disk apparatuses 5a to 5h.

First copies of data to be stored in the data regions 7 of each of the disk apparatuses 5a to 5h are to be distributedly arranged in first copy regions 8-1 of each of the disk apparatuses 5a to 5h other than a disk apparatus from which the copies of data are to be distributedly arranged (i.e., copies of data "0", "8", "16", "24", "32", and "40" are distributedly arranged in first copy regions 8-1 of each of the disk apparatus 5b (or any of disk apparatus 5c to 5h) other than a disk apparatus 5a from which the copies of data are to be distributedly arranged).

Second copies of data to be stored in each of the first copy regions 8-1 of each of the disk apparatuses 5a to 5h are to be distributedly arranged, with respect to each of the first copy regions 8-1 of each of the disk apparatuses 5a to 5h, in second copy regions 8-2 of each of the disk apparatuses 5a to 5h other than a disk apparatus from which the second copies of data are to be distributedly arranged, and any of a disk apparatus that any of original data of the second copies are to be stored in the data region (i.e., second copies of "0", "15", "22", "29", "36", and "43" which belong to the disk apparatus 5b and the first copy region 8-1 are to be distributedly arranged, in second copy regions 8-2 of each of the disk apparatuses 5c other than the disk apparatus 5b from which the second copies of data are to be distributedly arranged and disk apparatuses 5a, 5d, 5e, 5f, 5g, and 5h that any of original data of the second copies ("0", "15", "22", "29", "36", and "43") are to be stored in the data region 7).

In another exemplary aspect, this may be because copies of the data stored in the segments of data region 7 of each of magnetic disk apparatuses 5a to 5h are distributedly arranged in the particular copy regions of the {D−(N−1)} magnetic disk apparatuses different from the above one (for example, first copy region 8-1) and because the same copies as those stored in all the segments of the particular copy region of each of magnetic disk apparatus 5a to 5h are distributedly arranged, for all the segments, in the copy regions except the particular region of the (N−2) magnetic disk apparatuses different from the above one and the magnetic disk apparatus storing the original data for the copies stored in the segments of the particular region.

Further, the present exemplary embodiment can prevent read commands from the higher apparatus from concentrating on a particular magnetic disk apparatus. This is due to the provision of disk determining means 35 for determining the magnetic disk apparatus corresponding to the issuing destination of a read command so that an equal load is imposed on normally operating magnetic disk apparatuses.

Furthermore, the present exemplary embodiment makes it possible to reduce the tine required for a recovery process for a fault. The reason is as follows. When a fault occurs in a magnetic disk apparatus, a recovery process is executed; the contents stored in the segments of the faulty magnetic disk apparatus are loaded from other normally operating magnetic disk apparatuses and the loaded contents are unloaded into an alternative disk apparatus. On this occasion, data recovery means 40 determines the disk apparatus corresponding to a read destination so as to equalize the loads on the disk apparatuses.

Second Exemplary Embodiment

Now, exemplary description will be given the second exemplary embodiment of a disk array subsystem according to the present invention. The present exemplary embodiment is characterized in that a plurality of magnetic disk apparatuses constituting a mirror redundancy system may be divided into a plurality of groups and in that for each group, copies (redundant data) may be distributedly arranged among the magnetic disk apparatuses belonging to that group. Here, the grouping of the magnetic disk apparatuses may be called clustering. The resulting groups of magnetic disk apparatuses are called clusters.

Figure 12:
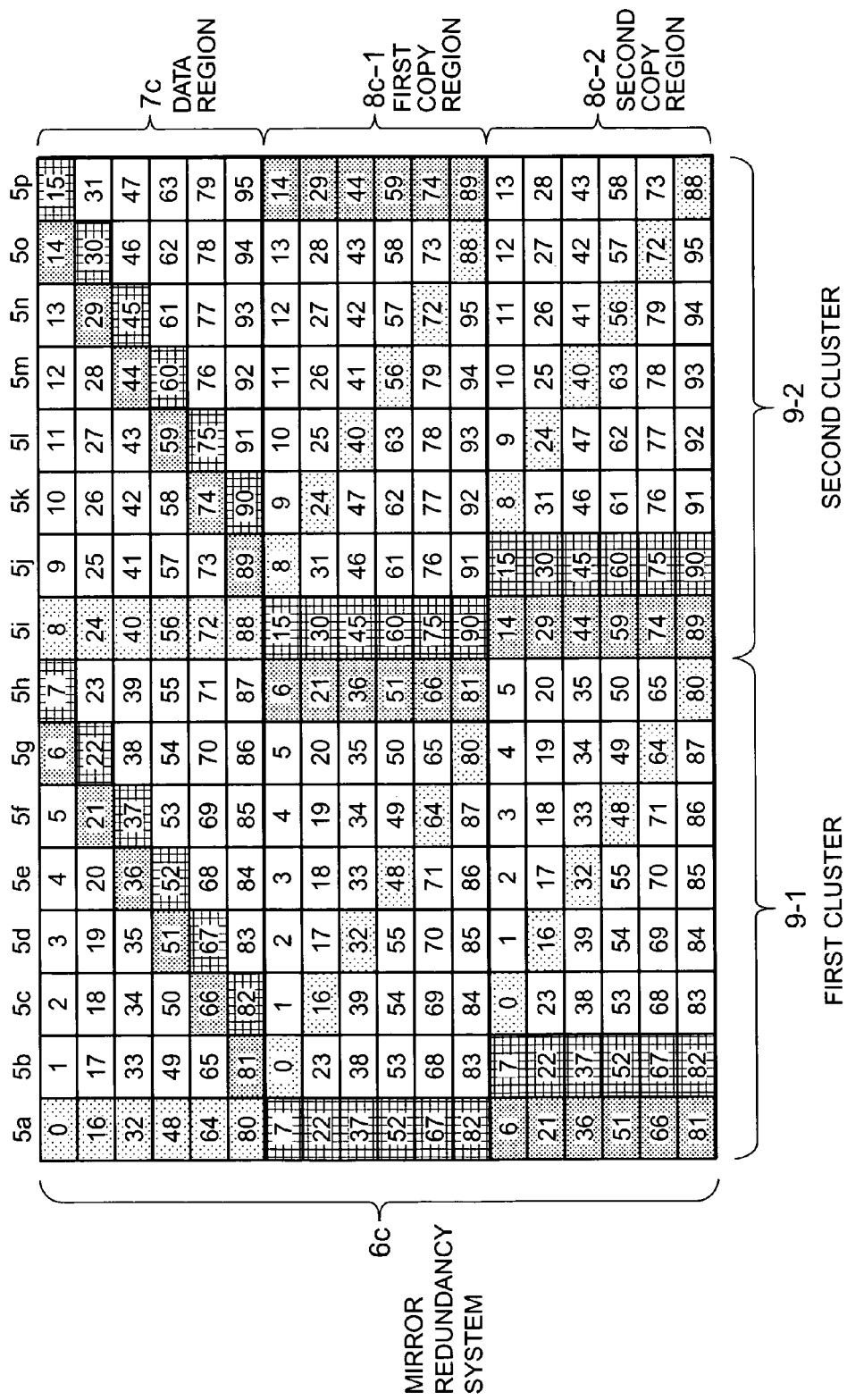
FIG. 12 shows an exemplary distribution layout showing an example of the configuration of mirror redundancy system 6c used according to a second exemplary embodiment of the present invention.

FIG. 12 shows an exemplary distribution layout showing an example of the configuration of a mirror redundancy system 6c used according to a second exemplary embodiment of the present invention. In the present exemplary embodiment, disk array subsystem 1, shown in FIG. 1, may be implemented by using mirror redundancy system 6c, shown in FIG. 12, in place of mirror redundancy system 6. In FIG. 12, for example, the redundancy is "3".

With reference to FIG. 12, mirror redundancy system 6c may include 16 magnetic disk apparatuses 5a to 5p provided with magnetic disk apparatus numbers "0" to "15", respectively. For example, the storage region of each of magnetic disk apparatuses 5a to 5p is divided into one data region 7c and a plurality of copy regions 8c-1 and 8c-2 the number of which may be determined by the redundancy N="3". Since the example shown in FIG. 12 may be an example of the redundancy of "3", the storage region may be divided as described above. For a redundancy of "4", for example, the storage region may be divided into one data region and three copy regions. For a redundancy of "5", for example, the storage region may be divided into one data region and four copy regions. For a redundancy of "N", for example, the storage region may be divided into one data region and (N−1) copy regions.

Moreover, each of data region 7c and copy regions 8c-1 and 8c-2 is divided into segments that are management units inherent in disk array subsystems. In FIG. 12, the same data is stored in the segments with the same number. In this case, for simplify the exemplary description each of data region 7c and copy regions 8c-1 and 8c-2 may be divided into six segments. However, the number of divisions is not limited to this.

Moreover, 16 magnetic disk apparatuses 5a to 5p are divided into two, first cluster 9-1 including magnetic disk apparatuses 5a to 5h and second cluster 9-2 including magnetic disk apparatuses 5i to 5p.

Moreover, for each of clusters 9-1 and 9-2, copies are distributedly arranged in the magnetic disk apparatuses belonging to that cluster. Specifically, copies of the data stored in the segments of data region 7c of each of magnetic disk apparatuses 5a to 5h, belonging to first cluster 9-1, are distributedly arranged in the copy regions 8c-1 and 8c-2 of the {D−(N−1)}=6 magnetic disk apparatuses different from the above one so that data or copies of the same contents are not arranged on the same magnetic disk apparatus. Copies of the data stored in the segments of data region 7c of each of magnetic disk apparatuses 5i to 5p, belonging to second cluster 9-2, are distributedly arranged in the copy regions 8c-1 and 8c-2 of the {D−(N−1)}=6 magnetic disk apparatuses different from the above one so that data or copies of the same contents are not arranged on the same magnetic disk apparatus.

For example, copies of the data stored in segments (segment numbers 0, 16, 32, 48, 64, and 80) of data region 7c of magnetic disk apparatus 5a, belonging to first cluster 9-1, are distributedly arranged in magnetic disk apparatuses 5b to 5g in first copy region 8c-1 and in magnetic disk apparatuses 5c to 5h in second copy region 8c-2. In this connection, copies of the data stored in the segments of data region 7c of each of the other magnetic disk apparatuses 5b to 5h belonging to first cluster 9-1 are distributedly arranged in the first and second copy regions 8c-1 and 8c-2 of the other magnetic disk apparatuses belonging to cluster 9-1.

Further, for example, copies of the data stored in the segments (segment numbers 8, 24, 40, 56, 72, and 88) of data region 7c of magnetic disk apparatus 5i, belonging to second cluster 9-2, are distributedly arranged in magnetic disk apparatuses 5j to 5o in first copy region 8c-1 and in magnetic disk apparatuses 5k to 5p in second copy region 8c-2. In this connection, copies of the data stored in the segments of data region 7c of each of the other magnetic disk apparatuses 5j to 5p belonging to second cluster 9-2 are distributedly arranged in the first and second copy regions 8c-1 and 8c-2 of the other magnetic disk apparatuses belonging to cluster 9-2.

A rule for the determination of the magnetic disk apparatuses in which the copies are to be arranged can be formulated, for example, as shown in the following Formula (2) below.

[Formula 2] (2)

$$k = \left[\left(\frac{i}{G}\right)\bmod C\right] \times G + \left\{i + \left(\frac{i}{D}\right)\bmod[G-(N-1)] + n\right\}\bmod G$$

In Formula (2), D denotes the total number of magnetic disk apparatuses, N denotes the redundancy, and C denotes the number of clusters. Further, G denotes the number of magnetic disk apparatuses per cluster, i denotes the segment number, n denotes the copy region number, and k denotes the apparatus number of the magnetic disk apparatus in which a copy of the data stored in the segment with the segment number i is placed in the copy region with the copy region number n. In the example shown in FIG. 12, D=8, N=3, C=2, and G=8. The apparatus number k of the magnetic disk apparatus is calculated in which the corresponding copy is placed in accordance with Formula (2).

For example, a copy of the data stored in the segment with the segment number "0", belonging to cluster 9-1, in data region 7c, is placed in magnetic disk apparatuses 5b and 5c in the first and second copy regions 8c-1 and 8c-2, respectively. Further, for example, a copy of the data stored in the segment with the segment number "8", belonging to cluster 9-2, in data region 7c, is placed in magnetic disk apparatuses 5j and 5k in the first and second copy regions 8c-1 and 8c-2, respectively. The magnetic disk apparatuses are similarly determined in which copies of the data stored in the other segments are to be arranged.

In mirror redundancy system 6c, shown in FIG. 12, the same number of magnetic disk apparatuses belong to each of clusters 9-1 and 9-2. However, different numbers of magnetic disk apparatuses may belong to the respective clusters. For example, six magnetic disk apparatuses 5a to 5f may constitute the first cluster, while ten magnetic disk apparatuses 5g to 5p may constitute the second cluster. Moreover, in mirror redundancy system 6c, shown in FIG. 12, the number of clusters is "2", for example.

However, the number may be only to be at least "2". However, in any case, the number of magnetic disk apparatuses constituting each cluster must be as follows. For example, if the redundancy N is "3", the number D of magnetic disk apparatuses may be at least (N+3). If the redundancy N is at least "4", the number D of magnetic disk apparatuses may be at least (N+2).

Further, according to the present exemplary embodiment, the operations performed during a write and read processes and when a fault occurs are similar those in the first exemplary embodiment, described above. Accordingly, their exemplary description is omitted.

Exemplary Advantages of Second Exemplary Embodiment

The present exemplary embodiment may have not only the same advantages as those of the first exemplary embodiment but also the advantage of being able to limit the range affected by a fault in a magnetic disk apparatus to the cluster to which that magnetic disk apparatus belongs. The present exemplary embodiment may further allow magnetic disk apparatuses to be added or replaced for each cluster. It thus has the advantage of enabling the configuration of the RAID system to be easily changed without the need to move data. This may be because the magnetic disk apparatuses constituting the disk array subsystem are divided into the plurality of clusters 9-1 and 9-2 so that the redundant data (copies) are distributedly arranged in each of clusters 9-1 and 9-2 as in the case of the first exemplary embodiment.

While this invention has been described with reference to exemplary embodiments, this description is not intended as limiting. Various modifications of the illustrative embodiments, as well as other embodiments of the invention, will be apparent to persons skilled in the art upon taking description as a whole. It is, therefore, contemplated that the appended claims will cover any such modifications or embodiments as fall within the true scope of the invention.

Further, the inventor's intent is to encompass all equivalents of all the elements of the claimed invention even if the claims are amended during prosecution.

This application is based on Japanese Patent Application No. 2004-318877 filed on Nov. 2, 2004 and including specification, claims, drawings and summary. The disclosure of the above Japanese Patent Application is incorporated herein by reference in its entirety.

What is claimed is:

1. A disk array subsystem, comprising D disk apparatuses, wherein:
    there is a redundancy of N (N is an integer equal to or larger than 3);
    said disk array subsystem includes data regions of each of said disk apparatuses and (N−1) copy regions on each of said disk apparatuses;
    first copies of data to be stored in said data regions of each of said disk apparatuses are to be distributedly arranged in first copy regions of each of said disk apparatuses other than a disk apparatus from which said copies of data are to be distributedly arranged; and
    second copies of data to be stored in each of said first copy regions of each of said disk apparatuses are to be distributedly arranged, with respect to each of said first copy regions of each of said disk apparatuses, in second copy regions of each of said disk apparatuses other than a disk apparatus from which said second copies of data are to be distributedly arranged, and any of a disk apparatus that any of original data of said second copies are to be stored in said data region;
    said disk array subsystem further comprising a segment management table that registers an apparatus number of a disk apparatus in which a segment is placed and an apparatus number of a disk apparatus in which a segment to which data stored in said segment is to be copied, for each said segment arranged in said data region.

2. The disk array subsystem according to claim 1, wherein, an apparatus number k of a disk apparatus in which a copy of data stored in a segment with a segment number I on said data region is determined by k={i+(i/D)mod[D−(N−1)]+n}mod D in said n-th copy region.

3. The disk array subsystem according to claim 2, further comprising:
    a disk determining device that determines a disk apparatus having a segment on said data region which is a data write destination and each disk apparatus having a segment on said copy region which is copy destination of said data, to be issuing destinations of said write command, when a write command is sent by a higher apparatus.

4. The disk array subsystem according to claim 1, further comprising a plurality of clusters, each having said D disk apparatuses.

5. The disk array subsystem according to claim 4, further comprising:
    a disk determining device that determines a disk apparatus having a segment on said data region which is a data write destination and each disk apparatus having a segment on said copy region which is a copy destination of said data, to be issuing destinations of said write command, when a write command is sent by a higher apparatus.

6. The disk array subsystem according to claim 1, further comprising:
    a disk determining device that determines a disk apparatus having a segment on said data region which is a data write destination and each disk apparatus having a segment on said copy region which is a copy destination of said data, to be issuing destinations of said write command, when a write command is sent by a higher apparatus.

7. The disk array subsystem according claim 6,
    wherein, said disk determining device that acquires, from said segment management table, said apparatus number of a disk apparatus which has a segment to which said write command is to write data and said apparatus number of a disk apparatus which has a segment to which said data to be stored in said segment is to be copied, and determines that said disk apparatuses with said apparatus numbers are issuing destinations of said write command.

8. The disk array sub system according to claim 6,
    wherein, said disk determining device determines a disk apparatus to which said read command is to be issued so that loads on normally operating disk apparatuses are equalized, when a read command is sent by said higher apparatus.

9. The disk array subsystem according to claim 8, further comprising:
    a data recovery device that loads, when a fault occurs in a disk apparatus, from other normally operating disk apparatuses, contents stored in each segment of said disk apparatus in which said fault is occurring and unloads said loaded contents into an alternative disk apparatus, said data recovery device determining said loading source disk apparatus so as to equalize loads on said disk apparatuses.

10. A method of distributed arrangement, comprising:
    providing a disk array subsystem which includes a redundancy of N (N is an integer equal to or larger than 3) and which includes D disk apparatuses;
    providing data regions of each of said disk apparatuses and (N−1) copy regions on each of said disk apparatuses;
    distributedly arranging first copies of data to be stored in said data regions of each of said disk apparatuses in first copy regions of each of said disk apparatuses other than a disk apparatus from which said copies of data are to be distributedly arranged;
    distributedly arranging second copies of data to be stored in each of said first copy regions of each of said disk apparatuses, with respect to each of said first copy regions of each of said disk apparatuses, in second copy regions of each of said disk apparatuses other than a disk apparatus from which said second copies of data are to be distributedly arranged, and any of a disk apparatus that any of original data of said second copies are to be stored in said data region; and referring to a segment management table that registers an apparatus number of a disk apparatus in which a segment is placed and an apparatus number of a disk apparatus in which a segment to which data stored in said segment is to be copied, for each said segment arranged in said data region.

11. The method according to claim 10, further comprising providing a plurality of clusters, each having said D disk apparatuses.

12. The method according to claim 11, further comprising:
when a write command is sent by a higher apparatus, determining a disk apparatus having a segment on said data region which is a data write destination and each disk apparatus having a segment on said copy region which is a copy destination of said data, to be issuing destinations of said write command.

13. A computer readable storage medium tangibly embodying a program for causing a computer to execute a method of claim 11.

14. The method according to claim 10, further comprising:
when a write command is sent by a higher apparatus, determining a disk apparatus having a segment on said data region which is a data write destination and each disk apparatus having a segment on said copy region which is a copy destination of said data, to be issuing destinations of said write command.

15. The method according to claim 14, further comprising:
when a read command is sent by said higher apparatus, determining a disk apparatus to which said read command is to be issued so that loads on normally operating disk apparatuses are equalized.

16. The method according to claim 15, further comprising:
when a fault occurs in a disk apparatus, loading, from other normally operating disk apparatuses, contents to be stored in each segment of said disk apparatus in which said fault is occurring;

unloading said loaded contents into an alternative disk apparatus; and determining said loading source disk apparatus so as to equalize loads on said disk apparatus.

17. A computer readable storage medium tangibly embodying a program for causing a computer to execute a method of claim 15.

18. A computer readable storage medium tangibly embodying a program for causing a computer to execute a method of claim 16.

19. A computer readable storage medium tangibly embodying a program for causing a computer to execute a method of claim 10.

* * * * *